United States Patent [19]
Hall
[11] 4,232,574
[45] Nov. 11, 1980

[54] APPARATUS AND METHOD FOR PROVIDING A CIGARETTE FILTER WITH AN AERATION GROOVE

[75] Inventor: Floyd V. Hall, Durham, N.C.
[73] Assignee: Liggett Group Inc., Montvale, N.J.

[21] Appl. No.: 826,136
[22] Filed: Aug. 19, 1977
[51] Int. Cl.[3] .......... B23B 3/04; B23B 5/14
[52] U.S. Cl. .......... 82/84; 82/101; 82/102; 131/10 A
[58] Field of Search .......... 131/88-94, 131/23 R, 261 B, 10 A; 93/1 C, 77 FT; 83/875, 876; 82/70.2, 83, 84, 101, 102

[56] References Cited

U.S. PATENT DOCUMENTS

| | | | |
|---|---|---|---|
| 4,022,221 | 5/1977 | Berger | 131/261 B |
| 4,135,523 | 1/1979 | Luke et al. | 131/261 B |
| 4,149,546 | 4/1979 | Luke et al. | 131/94 |

*Primary Examiner*—V. Millin
*Attorney, Agent, or Firm*—J. Bowen Ross, Jr.

[57] ABSTRACT

An apparatus and method is adapted to provide the filter of a cigarette with an annular perpheral groove to enable air to pass directly into the fibrous body of the filter material after passing through apertures in the tipping paper. Ordinary plug wrap paper instead of a high porosity tea bag paper to wrap the fibrous filter material.

The annular groove can be formed by a pair of rotating knives and a rotatable spacer with radial cutting edges which rout out material from each filter plug during conveyance of the plug on an alignment drum of a cigarette making machine. Alternatively, a plurality of closely spaced rotating knives which cut through the plug wrap paper only may be used to form a series of closely spaced annular grooves or slits in the filter periphery.

18 Claims, 10 Drawing Figures

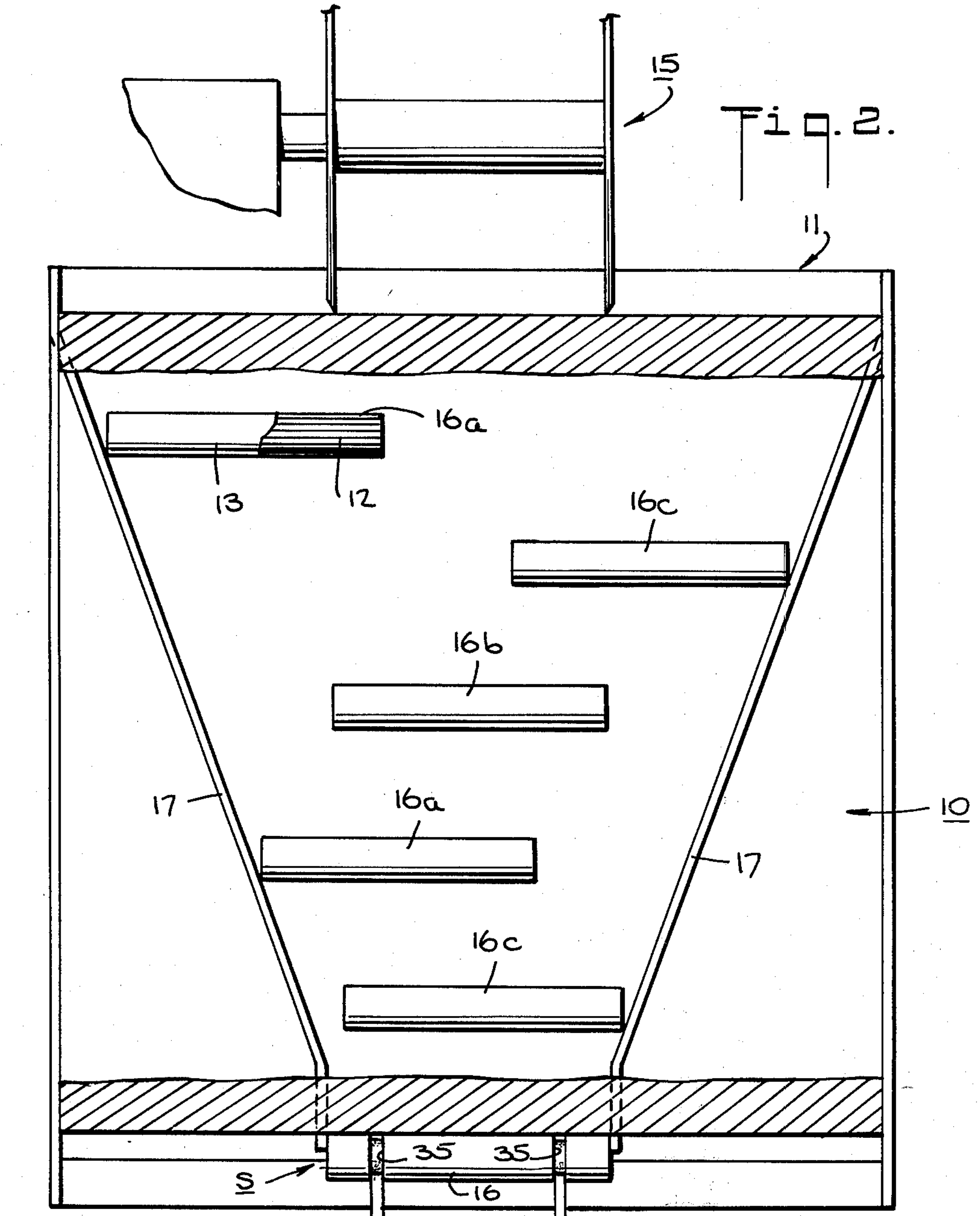
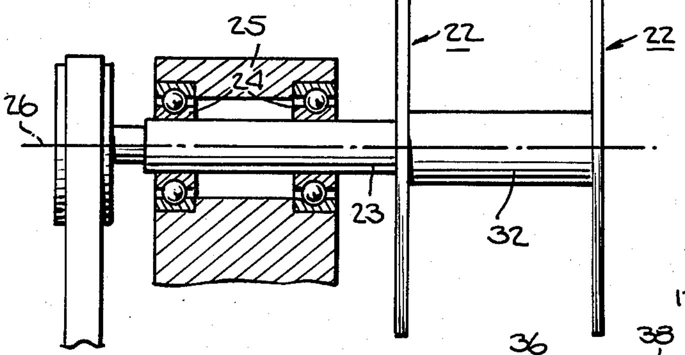
Fig. 2.
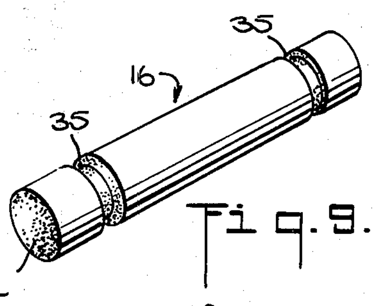
Fig. 9.
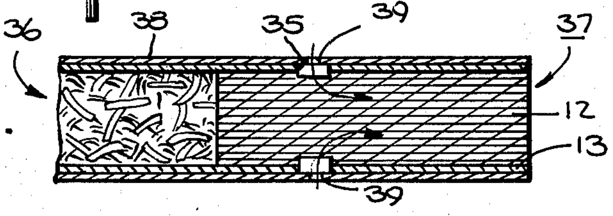
Fig. 11.

Fig.4.
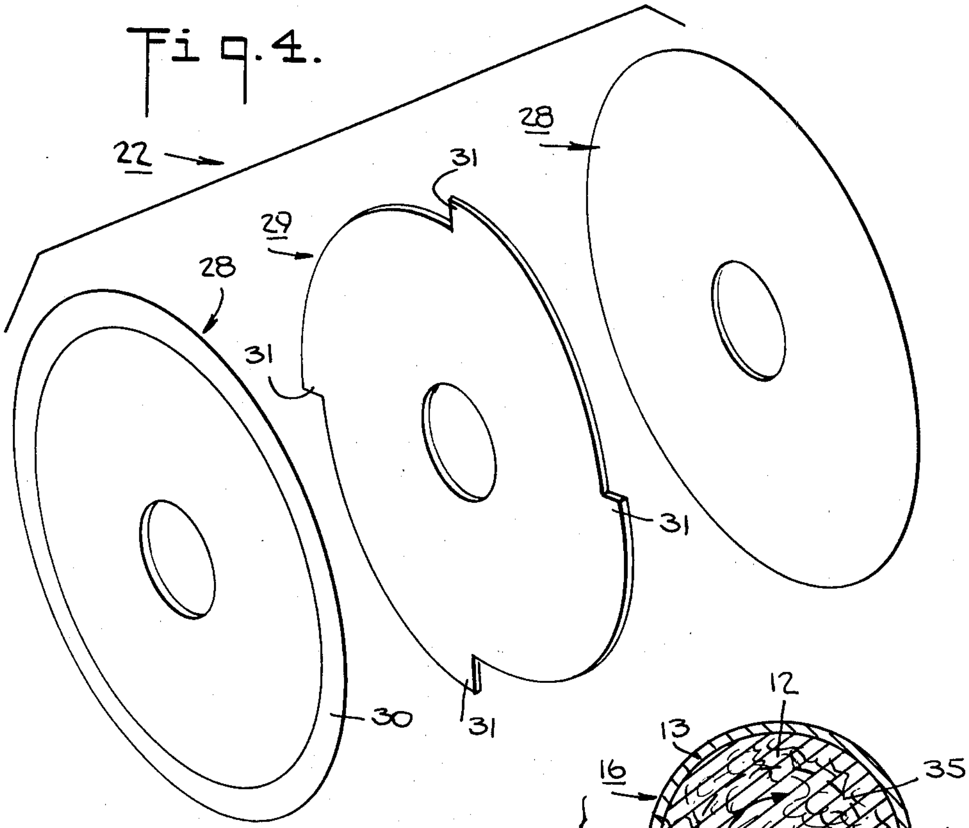
Fig.5.
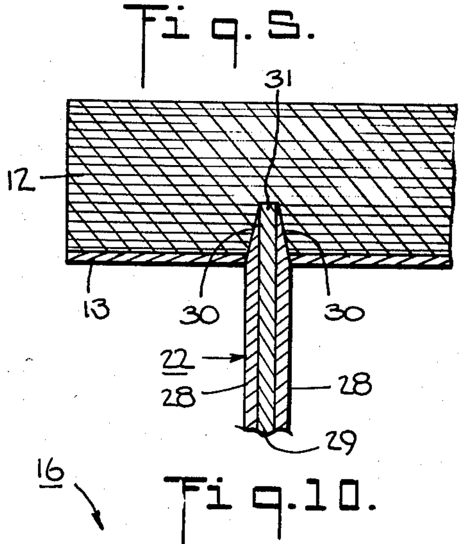
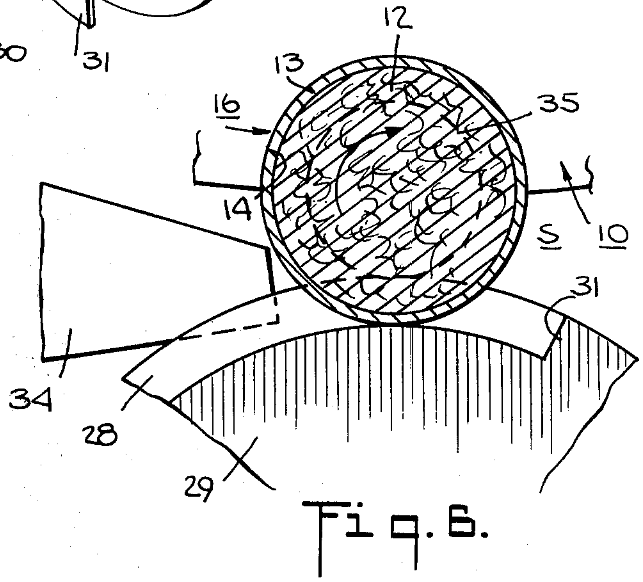
Fig.6.
Fig.10.
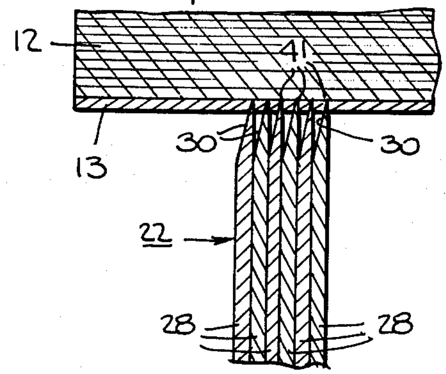
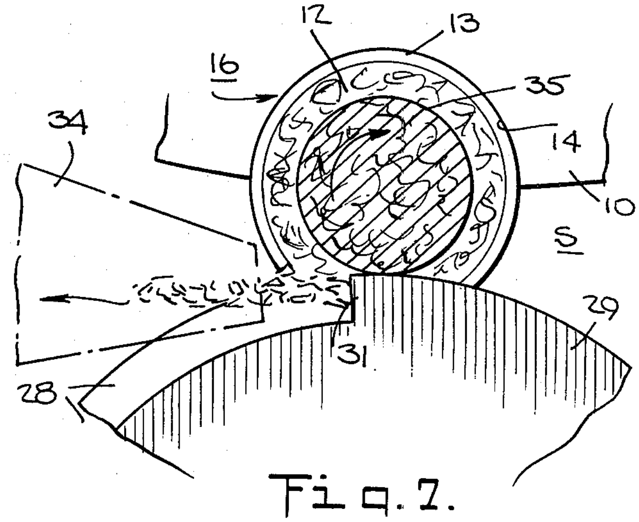
Fig.7.

APPARATUS AND METHOD FOR PROVIDING A CIGARETTE FILTER WITH AN AERATION GROOVE

This invention relates to an aeration groove filter. More particularly, this invention relates to an aeration groove filter, a filter cigarette made therewith, and an apparatus and method of forming an aeration groove filter.

Heretofore, various types of filters have been known for use in air dilution cigarettes wherein air is to be drawn into and mixed with a smoke stream during smoking of the cigarette. In some cases, the filters are constructed of plastic mouthpiece bodies which permit air and smoke to be drawn into a mixing chamber. In other cases, the filters are formed with peripherally disposed longitudinal grooves which allow streams of air to be drawn in along the outside of the filter for entry directly into the smoker's mouth. In still other cases, the filters have been of the fibrous type in which a strip of tipping paper used for securing the filter against a tobacco column is perforated about midway of the filter with an annular array of apertures to permit air to flow through the apertures to the filter during smoking of the cigarette. Generally, in this latter type of filter cigarette, in order to have the air pass into the filter body, the paper enveloping the filter material has been of high porosity. For example, tea bag paper is usually used for this purpose because if the paper were of low porosity, little or no air would pass into the filter for diluting the smoke passing through the filter.

However, high porosity papers such as tea bag paper are relatively expensive. Further, due to the generally delicate nature of high porosity paper, the paper must be handled in a careful manner on cigarette making machines so as to avoid ripping or tearing during processing. As a result, the cigarette making machines are usually operated at lower than normal speeds, e.g. at speeds of 2400 cigarettes per minute rather than 3600 cigarettes per minute.

Accordingly, it is an object of the invention to allow the use of ordinary plug wrap paper in a filter for an air dilution filter cigarette.

It is another object of the invention to provide a filter cigarette of high air dilution type in which high porosity tea bag paper is replaced by ordinary plug wrap paper in enveloping the filter body.

It is another object of the invention to reduce the cost of making high air dilution filter cigarettes.

It is another object of the invention to operate cigarette making machines at normal operating speeds rather than slower speeds when making high air dilution cigarettes.

It is another object of the invention to provide a simple technique for forming filters which permit the passage of air directly into the main body of the filter.

Briefly, the invention provides a filter having a body of entrainment-type fibrous filter material, a layer of plug wrap paper circumferentially about the filter material body and a peripheral groove of a depth at least equal to the thickness of the layer of plug wrap paper. The groove may penetrate into the filter material body or may penetrate only through the paper layer. In either case, the groove provides a direct communication between the circumferential exterior of the filter and the filter material body.

The invention also provides a high air dilution type filter cigarette which is comprised of a tobacco column, a filter of the above type which abuts the tobacco column and a layer of tipping paper which joins the filter and tobacco column together. The layer of tipping paper is provided with a circumferential array of perforations aligned with the groove in the filter for admitting air to the groove and, thence, into the filter body during smoking of the cigarette.

The invention further provides an apparatus and method of forming an aeration groove filter.

The apparatus comprises a conveying means for conveying a series of filter plugs formed of a layer of plug wrap paper circumferentially about a body of entrainment-type fibrous filter material in sequential order past a grooving station and a forming means adjacent the conveying means at the grooving station for forming at least one groove in each filter plug conveyed through the grooving station. The groove is sized so as to extend at least through the plug wrap paper layer to communicate the exterior of the filter plug with the body of filter material.

Where the filter plug is of a size to form a multiplicity of filters, a like number of forming means are positioned at the grooving station. For example, if the plug is to be cut in half to form two filters, two forming means are used to form a pair of spaced apart peripheral annular grooves in each plug with each groove located near a respective end of the plug.

In one embodiment, the forming means is rotatable about a fixed axis and includes a pair of spaced apart knives and a spacer between the knives. Each knife has a peripheral cutting edge for cutting into a filter plug in the grooving station while the spacer has a plurality of circumferentially spaced cutting edges for removing material from each filter plug between the two knives. When in use, the forming means is rotated at a speed higher than the speed at which the filter plug is passed through the grooving station. This ensures that the filter plug is rotated at least once during cutting of the groove. Further, during use, the two knives cut through the plug wrap paper and penetrate into the fibrous filter body. At the same time, the rapidly rotating cutting edges of the spacer rout out the paper and filter material between the two incisions formed by the knives in the filter plug.

In addition, a suction means is provided adjacent to the grooving station for drawing off the material which is removed from each filter plug.

In another embodiment, the forming means includes a plurality of rotatable knives each of which has a peripheral cutting edge for cutting into a filter plug on the conveying means. In this case, a plurality of closely spaced grooves or slits are formed in the plug wrap paper.

The conveying means for conveying the filter plugs may, for example, be a rotatable filter plug alignment drum. Generally, such drums are used in plug transfer machines for delivering a series of filter plugs via one or more storage drums to a filter attaching assembly of a cigarette making machine.

The method of the invention includes the steps of conveying a series of filter plugs having a body of entrainment-type fibrous filter material and a layer of plug wrap paper about the body in sequential order past a grooving station and of forming at least one peripheral groove in each filter plug while simultaneously rotating the filter plug during conveyance through the grooving station. This forming step includes a circumferential cutting of the layer of plug wrap paper to a depth at least equal to the thickness of the plug wrap paper or the removal of at least one circumferential strip of the plug wrap paper to form the groove.

These and other objects and advantages of the invention will become more apparent from the following detailed description and appended claims taken in conjunction with the accompanying drawings in which:

FIG. 3 illustrates a partial cutaway view of a forming means in accordance with the invention;

FIG. 4 illustrates an exploded view of the forming means of FIG. 3;

FIG. 5 illustrates a view taken on line V—V of FIG. 1;

FIG. 6 illustrates an enlarged view of the forming means of FIG. 1 in one phase of groove-forming at the grooving station;

FIG. 7 illustrates a view similar to FIG. 6 of the forming means in a second phase of groove-forming at the grooving station;

FIG. 8 illustrates a perspective view of a filter plug formed in accordance with the invention;

FIG. 9 illustrates a modified forming means in accordance with the invention; and FIG. 10 illustrates a view of a cigarette of high dilution type formed in accordance with the invention.

Figures 1, 2:
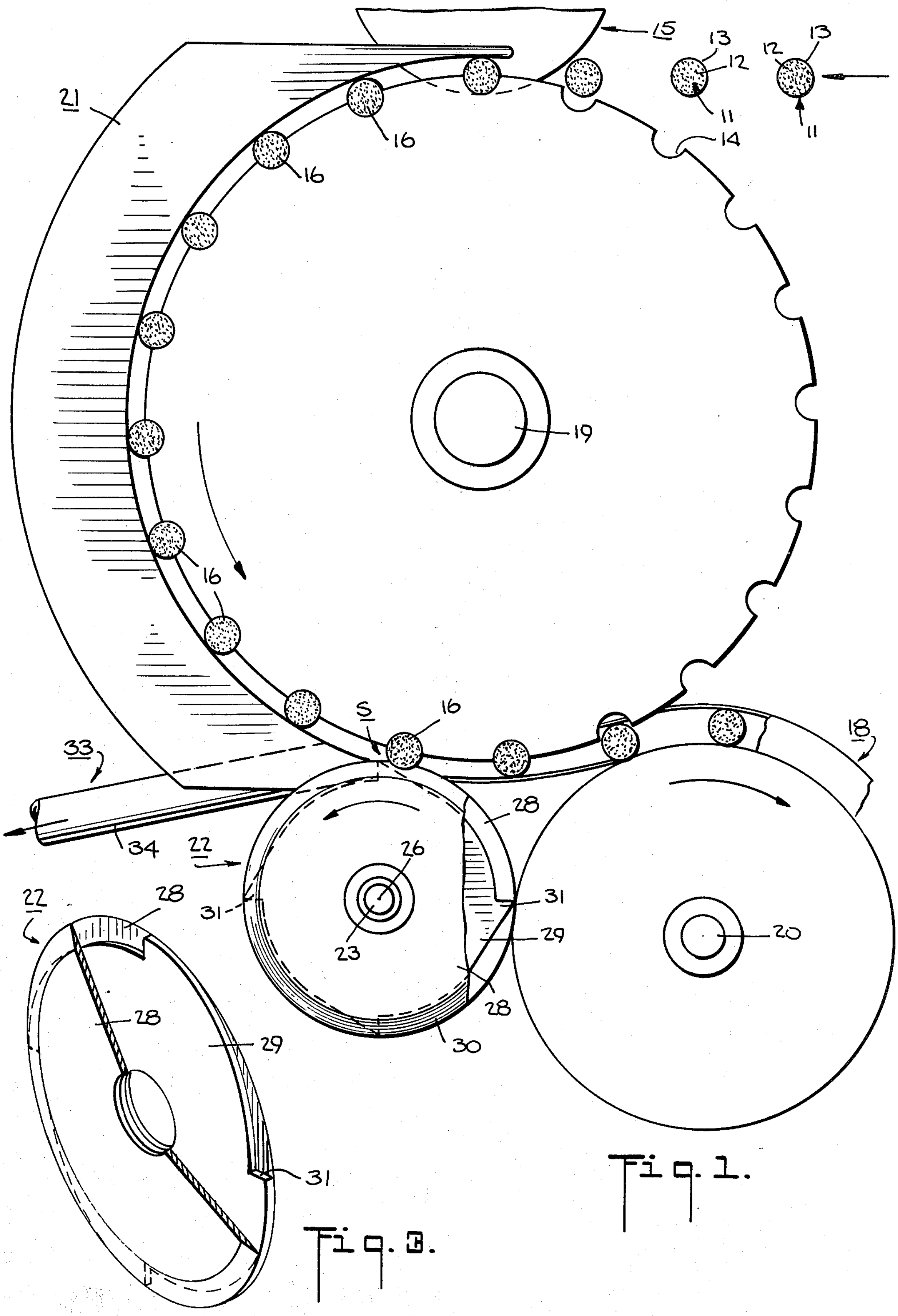
FIG. 1 illustrates a side view of a filter transfer assembly employing a groove forming means in accordance with the invention.
FIG. 2 illustrates an end view of the apparatus illustrated in FIG. 1.

Only those parts of a cigarette making machine necessary to an understanding of the invention will be described hereinafter.

Referring to FIG. 1, the cigarette making machine has a conveying means in the form of a rotatable filter plug alignment drum 10 for sequentially receiving and aligning a series of filter rods 11. Each rod 11 is composed of a body 12 of entrainment-type fibrous filter material such as cellulose acetate enveloped in a layer 13 of ordinary plug wrap paper. As shown in FIG. 2, each rod 11 is sized to produce six filters. The drum 10 includes a plurality of peripherally disposed grooves 14 which extend across the width of the drum 10 (FIG. 2) to receive and convey the filter rod 11. In addition, the drum 11 cooperates with a knife assembly 15 of known construction to sever a received filter rod 11 into a multiplicity of filter plugs 16, e.g. three plugs **16*a*, 16*b*, 16*c* (FIG. 2). Each of these plugs 16, in turn, is sized to form two filters. Suitable fixed guides 17 (FIG. 2) are provided about the drum 10 in order to align the filter plugs 16 cut from the filter rods 11** into a single row.

As shown in FIG. 1, the cigarette making machine also includes a storage means such as a drum 18 for sequentially receiving the filter plugs 16 from the alignment drum 10. Both the alignment drum 10 and the storage drum 18 are mounted on suitable shafts 19, 20 and are driven in synchronism from a main drive (not shown). In addition, a shroud 21 is mounted to partially surround the alignment drum 10 in order to retain the filter plugs 16 in the grooves 14 until the plugs 16 arrive at a grooving station S located at a point of the alignment drum 10 upstream of the transfer point at which the plugs 16 are transferred to the storage drum 18.

Referring to FIG. 2, a pair of forming means 22 is positioned adjacent to the drum 10 at the grooving station S for forming two peripheral grooves in each filter plug 16. These forming means 22 are fixedly mounted on a rotatable shaft 23 which is rotatably mounted via bearings 24 in a frame 25 fixed to the machine to rotate about a fixed axis 26 parallel to the axes of the shafts 19, 20. The shaft 23 is driven off the transmission (not shown) of the cigarette making machine via a suitable belt, chain, gear or the like 27.

Referring to FIGS. 3 and 4, each forming means 22 is constructed of a pair of knives 28 and a spacer 29 which spaces the knives 28 apart. Each knife 28 is of circular shape and has a peripheral bevelled cutting edge 30 (FIG. 5) which is disposed to project into the plane of a filter plug 16 in the grooving station S. The spacer 29 is of generally plate-like construction with a plurality of circumferentially spaced cutting edges 31. Each cutting edge 31 is formed at the forward end in a radially raised manner relative to the remainder of the spacer 29 with a trailing edge receding into the spacer 29.

Referring to FIG. 2, each of the knives 28 and spacer 29 has a central aperture (FIG. 4) for fitting over the shaft 23 and each forming means 22 is secured to the shaft 23 in a suitable fashion to rotate with the shaft 23. As shown, a spacer tube 32 spaces the two forming means 22 apart. The forming means 22 are thus synchronized to rotate with the drum 10 but at a much greater speed than the drum 10. For example, the knives 29 are set to rotate at 10,000 rpm.

Referring to FIG. 1, a suction means 33 is also provided adjacent the alignment drum 10 and knives 28 for drawing off material removed from a filter plug 16 during grooving. As shown, the suction means 33 includes a conduit 34 with an open mouth at the grooving station S through which material can be drawn.

As indicated in FIG. 6, the knives 28 are sized to project into the plane of a filter plug 16 when the plug 16 is in the grooving station. In addition, each cutting edge 31 of the spacer 29 is sized to project into the filter plug 16 to the same extent as the knives 28 (see FIG. 5).

Referring to FIG. 1, in order to form an aerated groove filter, a series of filter rods 11 are conveyed as is known to the alignment drum 10, severed by the knife assembly 15 into filter plugs 16 and the plugs 16 thereafter aligned in the grooves 14 and conveyed to the grooving station S. During this time, the shaft 23 is rotating so that the knives 28 of each forming means 20 sequentially cut into the filter plugs 16 as the plugs 16 pass through the grooving station S. Because of the greater speed of these knives 28, the plugs 16 rotate at least once within the grooving station S. In addition, while the plugs 16 rotate in the grooving station S, the cutting edges 31 of the spacer 29 rout out the material between the incisions made by the knives in each plug 16 so as to form a groove 35. As shown in FIG. 7, the material which is routed out of the filter plug 16 is drawn off through the suction conduit 34. Each filter plug 16 is thus formed with a pair of grooves 35 (FIG. 8) each of which is disposed near an opposite end of the plug 16. Each filter plug 16 can then be cut in half in a subsequent operation, as is known, to form two filters.

In operation, the speed of the filter plug 16 through the grooving station S corresponds to a production speed of, e.g. 3600 filters per minute while the speed of the forming means 22 is such as to ensure that each plug 16 is completely rotated so that a circumferential groove 35 is formed about the plug 16.

Referring to FIG. 10, the filter cigarette made on the cigarette making machine thus has a tobacco column 36 which is abutted against a filter 37 severed from a grooved filter plug 16 (FIG. 8) and a layer of tipping paper 38 which joins the filter 37 and the tobacco column 36 together. As shown, the filter 37 has a cylindrical body 12 of entrainment-type fibrous filter material, a layer 13 of plug wrap paper circumferentially about the body and an annular peripheral groove 35 communicating the exterior of the filter 37 with the body of filter material 12. Also, the layer of tipping paper 38 has a circumferential array of perforations 39 aligned with the groove 35 in the filter 37 for admitting air into the filter body 12 as indicated during smoking of the cigarette.

Referring to FIG. 9, the forming means 22' may alternatively be constructed of a plurality, e.g. six, rotatable knives 28, each of which has a peripheral cutting edge 30 for cutting into a filter plug 16 on the drum 10. In this case, the knives 28 are located within a space of two millimeters and are of a radial size to cut into the filter plug 16 a distance equal to the thickness of the plug wrap paper layer 13. In this way, the filter plug 16 is provided with six closely spaced grooves or slits 41 at each forming means 22'. The strips of paper between the grooves 41 remain adhered to the fibrous body of the filter plug 16 via the adhesive used to initially secure the plug wrap paper to the body of fibrous filter material as is known. Each groove 41 is thus of a depth equal to the thickness of the plug wrap paper layer 13.

Alternatively, the means for forming the grooves in the filter plugs 16 may be constructed of abrading discs or wheels which, in operation, strips away only the layer of plug wrap paper from a filter plug in the grooving station.

Since the filters 37 can be made with ordinary plug wrap paper, the filter plugs 16 can be made and processed on conventional machinery at normal operating speeds such as 3600 filters per minute. Generally, filter plugs which employ tea bag paper as the enveloping wrapper can only be processed at speeds of 2400 filters per minute.

The invention thus provides a relatively simple mechanism for forming circumferential grooves in a filter for use in a high air dilution cigarette. Further, the mechanism can be readily incorporated into existing machinery and can be used at the normal operating speeds of such machinery.

The invention further provides a technique of ensuring a continuous annular groove within a filter for subsequent alignment with the perforations of a layer of tipping paper in a filter cigarette. In this way, the flow of air into the filter during smoking of the cigarette is ensured.

The filters of the invention can be constructed to control the dilution rates of filter cigarettes. For example, by varying the size of the aeration grooves, the smoke generated during smoking a cigarette can be diluted with air, for example in a range of from 40% to 60%.

By employing ordinary plug wrap paper in the manufacture of the filters, the cost of materials for such filters can be significantly reduced. In addition, since the normal operating speeds of the cigarette making machine can be utilized, increased output is also available. These two factors can result in considerable savings in the production of high air dilution type filter cigarettes.

What is claimed is:

1. In an apparatus for providing an aeration groove in a filter plug having a layer of plug wrap paper circumferentially about a body of entrainment-type fibrous filter material, the combination comprising
   - a rotatable filter plug alignment drum having a plurality of peripherally disposed grooves for sequentially receiving and aligning a plurality of filter plugs,
   - a storage drum for sequentially receiving the filter plugs from said alignment drum, and
   - means adjacent said drums for forming at least one peripheral groove in each filter plug to extend through said plug wrap paper and being at least the depth of said plug wrap paper to communicate the exterior of the filter plug with the body of filter material.

2. In an apparatus for forming an aeration groove filter, the combination comprising
   - a conveying means for conveying a series of filter plugs in sequential order past a grooving station, each said plug having a layer of plug wrap paper circumferentially about a body of entrainment-type fibrous filter material, and
   - a forming means adjacent said conveying means at said station for forming at least one peripheral groove in each filter plug conveyed through said station, wherein the groove extends through the layer of plug wrap paper to communicate the exterior of the filter plug with the body of filter material.

3. The combination as set forth in claim 2 wherein said forming means forms a pair of spaced apart peripheral grooves in each filter plug, each of said grooves being located near a respective end of a filter plug.

4. In a method of forming aeration groove filters, the steps of
   - conveying a series of filter plugs having a body of entrainment-type fibrous filter material and a layer of plug wrap paper about said body in sequential order past a grooving station, and
   - forming at least one peripheral groove in each filter plug while simultaneously rotating the filter plug during conveyance through said grooving station, said groove extending through the layer of plug wrap paper to communicate with the body of filter material.

5. In a method as set forth in claim 4 wherein said step of forming includes circumferential cutting of the layer of plug wrap paper to a depth at least equal to the thickness of the plug wrap paper.

6. In a method as set forth in claim 4 wherein the step of forming includes removal of at least one circumferential strip of the plug wrap paper to form said groove.

7. In an apparatus for providing an aeration groove in a filter having a layer of plug wrap paper circumferentially about a body of entrainment-type fibrous filter material, the combination comprising
   - a rotatable filter plug alignment drum having a plurality of peripherally disposed grooves for sequentially receiving and aligning a plurality of filter plugs,
   - a storage drum for sequentially receiving the filter plugs from said alignment drum, and
   - means adjacent said drums for forming at least one peripheral groove in each filter plug being at least the depth of said plug wrap paper, said means including a pair of spaced apart rotatable knives and a rotatable spacer between and spacing said knives, each said knife having a peripheral cutting edge for cutting into a filter plug on said alignment drum and said spacer having a plurality of circumferentially spaced cutting edges for removing material from each filter plug between said knives.

8. The combination as set forth in claim 7 wherein said knives and said spacer are mounted for rotation at a speed greater than the speed of rotation of said alignment drum.

9. The combination as set forth in claim 7 which further comprises a suction means adjacent said alignment drum and said knives for drawing off material removed from a filter plug.

10. In an apparatus for providing an aeration groove in a filter having a layer of plug wrap paper circumferentially about a body of entrainment-type filter material, the combination comprising a rotatable filter plug alignment drum having a plurality of peripherally disposed grooves for sequentially receiving and aligning a plurality of filter plugs, a storage drum for sequentially receiving the filter plugs from said alignment drum, and means adjacent said drums for forming at least one peripheral groove in each filter plug being at least the depth of said plug wrap paper, said means including a plurality of rotatable knives, each said knife having a peripheral cutting edge for cutting into a filter plug on said alignment drum.

11. The combination as set forth in claim 10 wherein said plurality of rotatable knives number six within a space of two millimeters.

12. The combination as set forth in claim 11 wherein said knives are rotatable in unison at a speed greater than the speed of rotation of said alignment drum.

13. In an apparatus for forming an aeration groove filter, the combination comprising a conveying means for conveying a series of filter plugs in sequential order past a grooving station, and a forming means adjacent said conveying means at said station for forming at least one peripheral groove in each filter plug conveyed through said station, said forming means being rotatable about a fixed axis to remove material from each filter plug.

14. In an apparatus for forming an aeration groove filter, the combination comprising a conveying means for conveying a series of filter plugs in sequential order past a grooving station, and a forming means adjacent said conveying means at said station for forming at least one peripheral groove in each filter plug conveyed through said station, said forming means including a pair of spaced apart rotatable knives and a rotatable spacer between and spacing said knives, each said knife having a peripheral cutting edge for cutting into a filter plug on said conveying means and said spacer having a plurality of circumferentially spaced cutting edges for removing material from each filter plug between said knives.

15. The combination as set forth in claim 14 which further comprises a suction means adjacent said knives for drawing off material removed from a filter plug.

16. In an apparatus for forming an aeration groove filter, the combination comprising a conveying means for conveying a series of filter plugs in sequential order past a grooving station, and a forming means adjacent said conveying means at said station for forming at least one peripheral groove in each filter plug conveyed through said station, said means including a plurality of rotatable knives, each said knife having a peripheral cutting edge for cutting into a filter plug on said conveying means.

17. The combination as set forth in claim 16 wherein said plurality of knives number six within a space of two millimeters.

18. In an apparatus for providing an aeration groove in a filter plug having a layer of plug wrap paper circumferentially about a body of entrainment-type fibrous filter material, the combination comprising a rotatable drum having a plurality of peripherally disposed grooves for sequentially receiving and conveying a plurality of filter plugs, a storage means for sequentially receiving the filter plugs from said drum, and means adjacent said drum for forming at least one peripheral groove in each filter plug to extend through said plug wrap paper and being at least the depth of said plug wrap paper to communicate the exterior of the filter plug with the body of filter material.

* * * * *